(12) United States Patent
Khushu et al.

(10) Patent No.: US 8,040,240 B2
(45) Date of Patent: Oct. 18, 2011

(54) METHOD AND APPARATUS TO AUTOMATICALLY TRIGGER POSITION LOCATION FIXES FOR EXTERNAL DEVICES

(75) Inventors: Sanjeev Khushu, San Diego, CA (US); Chihyuan Liao, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 864 days.

(21) Appl. No.: 11/551,484

(22) Filed: Oct. 20, 2006

(65) Prior Publication Data

US 2009/0267838 A1 Oct. 29, 2009

Related U.S. Application Data

(60) Provisional application No. 60/729,300, filed on Oct. 20, 2005.

(51) Int. Cl.
*G08B 21/00* (2006.01)
(52) U.S. Cl. .................... 340/540; 340/539.13
(58) Field of Classification Search .......... 340/540
See application file for complete search history.

(56) References Cited

U.S. PATENT DOCUMENTS

| | | | |
|---|---|---|---|
| 5,812,087 A | 9/1998 | Krasner | |
| 5,841,396 A | 11/1998 | Krasner | |
| 5,874,914 A * | 2/1999 | Krasner | 342/357.12 |
| 5,945,944 A | 8/1999 | Krasner | |
| 5,999,124 A | 12/1999 | Sheynblat | |
| 6,061,018 A | 5/2000 | Sheynblat | |
| 6,208,290 B1 | 3/2001 | Krasner | |
| 6,215,442 B1 | 4/2001 | Sheynblat et al. | |
| 6,768,909 B1 * | 7/2004 | Irvin | 455/456.1 |
| 2002/0116080 A1 * | 8/2002 | Birnbach et al. | 700/66 |
| 2003/0054813 A1 | 3/2003 | Riley et al. | |
| 2005/0064903 A1 | 3/2005 | Uotsu et al. | |

FOREIGN PATENT DOCUMENTS

| | | |
|---|---|---|
| EP | 1215508 | 6/2002 |
| EP | 1215508 A1 * | 6/2002 |
| RU | 37446 | 4/2004 |
| RU | 39434 | 7/2004 |
| WO | WO2004019054 | 3/2004 |
| WO | WO2004045110 | 5/2004 |

OTHER PUBLICATIONS

International Search Report—PCT/US06/060130, International Search Authority—European Patent Office, Apr. 10, 2007.
Written Opinion—PCT/US06/060130, International Search Authority—European Patent Office, Apr. 10, 2007.
International Preliminary Report on Patentability—PCT/US06/060130, The International Bureau of WIPO, Geneva, Switzerland, May 2, 2008.

\* cited by examiner

*Primary Examiner* — Travis Hunnings
(74) *Attorney, Agent, or Firm* — Andrea L. Mays; Howard H. Seo

(57) ABSTRACT

A method and apparatus automatically triggers position location fixes for external devices. In one embodiment of the present invention, a mobile station generates position location data for a position location function in an external device in response to determining that the mobile station is electrically coupled to the external device, and in response to determining that the position location function in the external device is active. The mobile station does not generate position location data for the position location function in the external device in response to determining that the mobile station is electrically decoupled from the external device, or in response to determining that the position location function in the external device is not active.

27 Claims, 3 Drawing Sheets

Communication System 10

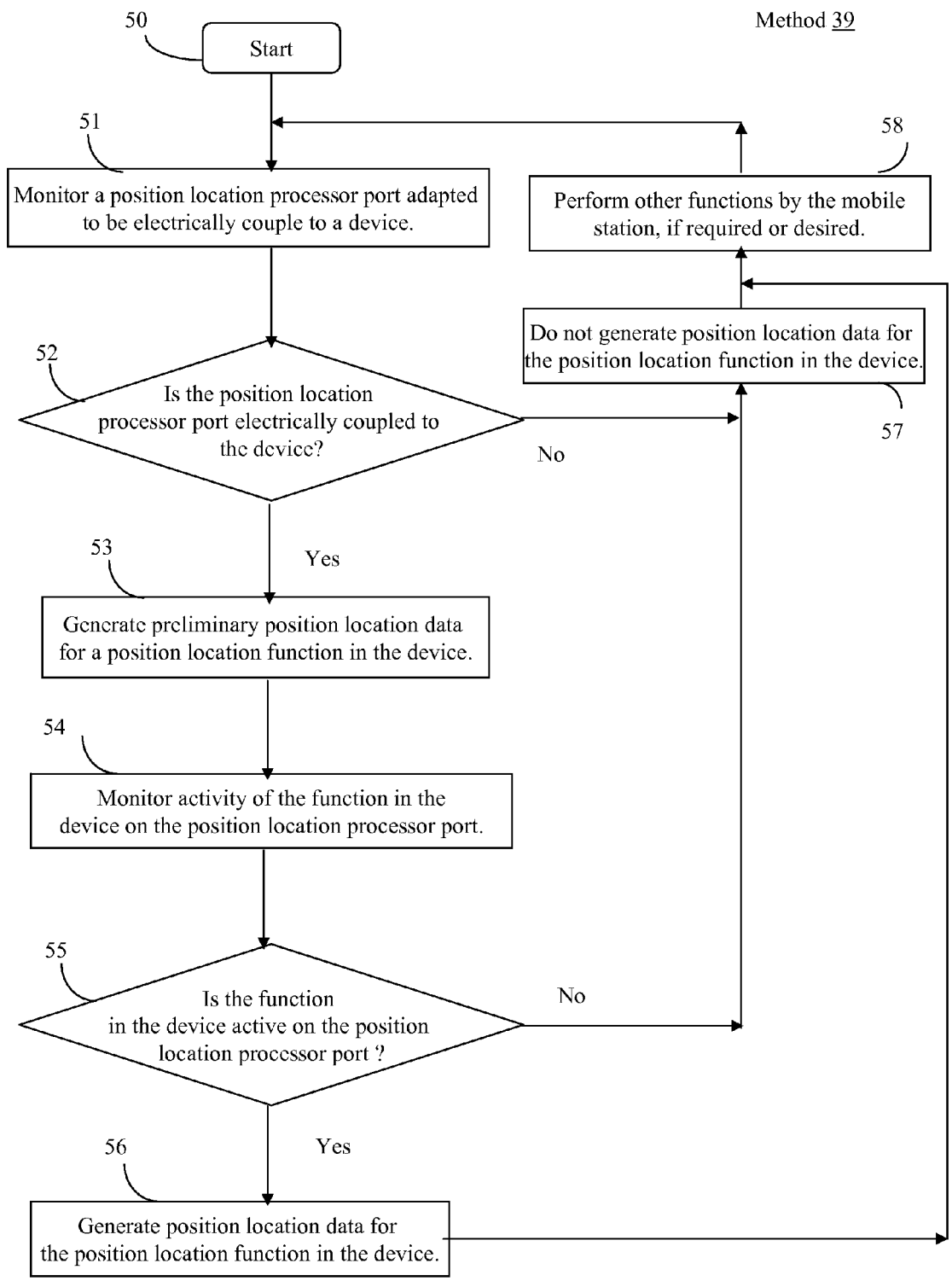

METHOD AND APPARATUS TO AUTOMATICALLY TRIGGER POSITION LOCATION FIXES FOR EXTERNAL DEVICES

CROSS-REFERENCE TO RELATED APPLICATIONS

The present application claims priority to U.S. Provisional Application No. 60/729,300, filed by Sanjeev Khushu, et al. on Oct. 20, 2005.

FIELD OF THE INVENTION

The present invention generally relates to communication systems. More particularly, the present invention relates to a method and an apparatus to automatically start and/or stop the generation of position location data for position location functions in external devices, which are adapted to be electrically coupled to and electrically decoupled from a mobile station.

BACKGROUND OF THE INVENTION

A stand alone, independent, and portable global positioning satellite (GPS) receiving device generates position location data when it is turned on and operational.

Mobile stations, such as cellular telephones, may generate position location data, either alone, via an integrated GPS receiver, and/or in combination with a communication system (e.g., a cellular telephone system) when the mobile station is turned on and operational.

Some external devices have position location functions that use or require position location data, but do not have an integral position location device, such as a GPS receiver. Such external devices may be connected to a stand alone, independent, portable GPS receiving device to receive the position location data when the GPS receiving device is turned on and operational. Since the primary function of the GPS receiving device primarily is to determine and generate position location data, the GPS receiving device is turned on when the external device needs or requires the position location data, and the GPS receiving device is turned off when the external device does not need or require the position location data. Turning on and off (e.g., manually) the GPS receiving device conserves resources, such as the portable power supply, processing, memory, network usage, etc.

Some position location devices or functions, which are internal to, integrated with, and embedded in a mobile station, receive position location data from the mobile station in response to an internally generated trigger or request, such as via an application program interface (API). Such a trigger conserves resources, such as the portable power supply, processing, memory, network usage, etc. with the mobile station. Such a trigger is practical and reasonable to implement in the mobile station, since the internal position location device and the mobile station are designed to work together and are designed at the same time.

Connecting external devices, having position location devices or functions, to a mobile station, having the ability to generate position location data, presents an undesirable engineering tradeoff. When an external device is connected to a mobile station, the mobile station does not know when to start and/or stop generating the position location data. For example, when the mobile station is turned on and operational to generate the position location data for the position location devices or functions in the external device, valuable resources may be unnecessarily consumed, if such position location devices or functions do not immediately or regularly need or require the position location data. Further, unnecessarily consuming the mobile station's resources has a detrimental effect on other functions in the mobile station that rely on the same resources. For example, unnecessarily generating position location data that are not used by the external device drains the mobile station's battery, which in turn reduces the mobile station's talk time or standby time.

Alternatively, if the mobile station is turned on and off, like the stand alone, independent, portable GPS receiving device described above, to conserve the mobile stations resources, then other desirable functions of the mobile station are not available to be used when the mobile station is turned off. For example, the mobile station cannot remain in standby mode, waiting for an incoming call, when the mobile station is turned off.

Therefore, there is a need for a method and an apparatus to automatically start and/or stop the generation of position location data for position location functions in external devices, which are adapted to be electrically coupled to and electrically decoupled from a mobile station.

SUMMARY OF THE INVENTION

The present invention includes a method and/or an apparatus, which performs the method. The apparatus include data processing systems, which perform the method, and computer readable media storing executable applications which, when executed on the data processing systems, cause the data processing systems to perform the method.

According to one aspect of the present invention, the method and the apparatus automatically start and/or stop the generation of position location data for position location functions in external devices, that are adapted to be electrically coupled to and electrically decoupled from a mobile station.

According to another aspect of the present invention, the method and the apparatus, employed by a mobile station, determine whether the mobile station is electrically coupled to or electrically decoupled from an external device. The method and the apparatus determine further whether a position location function in the external device is active in response to determining that the mobile station is electrically coupled to the external device. The position location function in the external device performs a position location operation in response to receiving position location data from the mobile station. The method and the apparatus generate position location data for a position location function in the external device in response to determining that the mobile station is electrically coupled to the external device, and in response to determining that the position location function in the external device is active. The method and the apparatus do not generate position location data for the position location function in the external device in response to determining that the mobile station is electrically decoupled from the external device, or in response to determining that the position location function in the external device is not active.

These and other aspects of the present invention will be apparent from the accompanying drawings and from the following detailed description.

BRIEF DESCRIPTION OF THE DRAWINGS

Aspects of the present invention are illustrated by way of examples and not limitation in the figures of the accompanying drawings, in which like reference numbers designate corresponding elements.

FIG. 3 illustrates a method, which may be employed by the mobile station, as shown in FIG. 2, according to one embodiment of the present invention.

DETAILED DESCRIPTION OF THE EMBODIMENTS

The following description and drawings are illustrative of the invention and are not to be construed as limiting the invention. Numerous specific details are described to provide a thorough understanding of the present invention. However, in certain instances, well-known or conventional details are not described in order to avoid obscuring the description of the present invention. References to one embodiment or an embodiment in the present disclosure are not necessarily to the same embodiment, and such references include one or more embodiments.

Communication System 10

Figure 1:
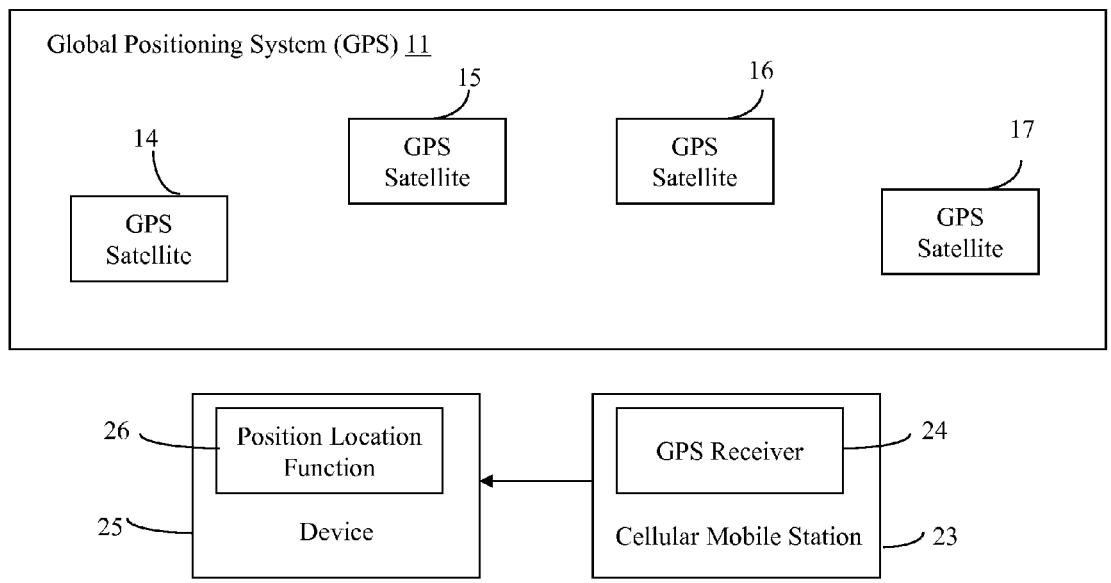
FIG. 1 illustrates a block diagram representation of a communication system, including a mobile station and a device, according to one embodiment of the present invention.
Figure 1:
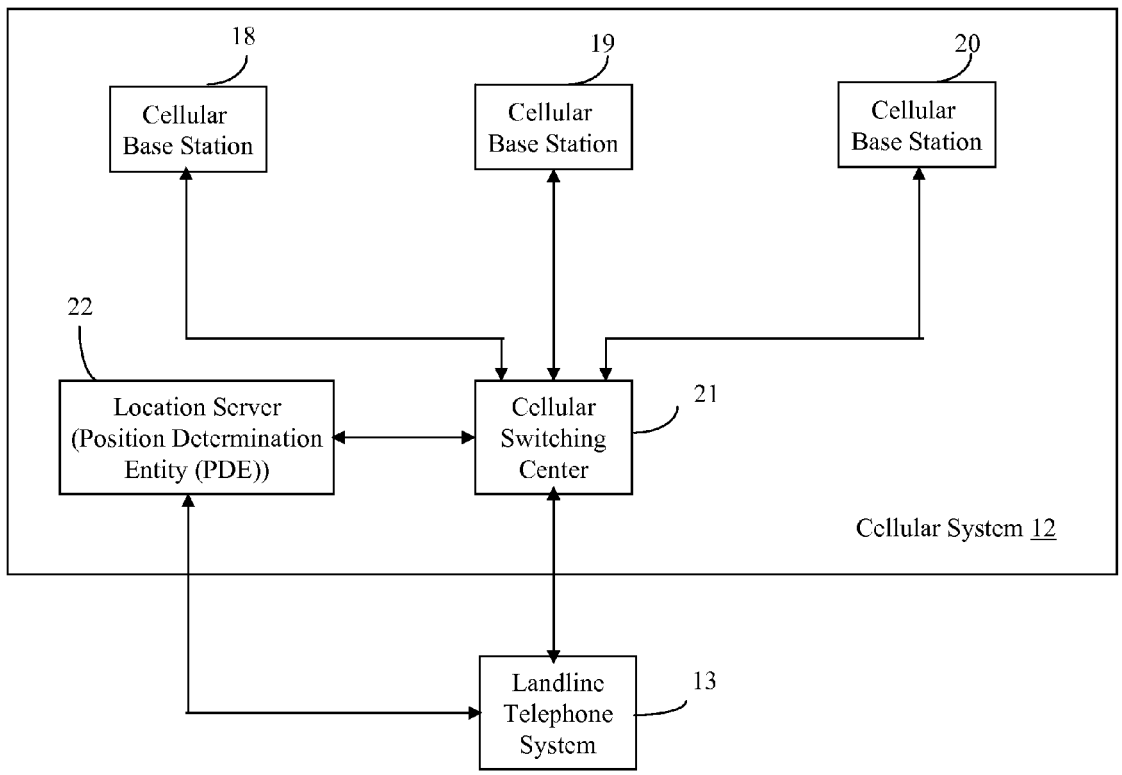

FIG. 1 illustrates a block diagram representation of a communication system 10 ("system"), including a mobile station 23 and a device 25. The system 10 includes a Global Positioning Satellite (GPS) system 11, a cellular system 12, and a landline telephone system 13. The GPS system 11 includes multiple GPS satellites 14-17. The cellular system 12 includes multiple cellular base stations 18-20, a cellular switching center 21, and a location server, which is otherwise called a position determining entity (PDE) 22. A cellular mobile station 23 ("mobile station") includes a GPS receiver 24 that communicates with the GPS 11, and includes a cellular transceiver 32 (shown in FIG. 2) that communicates with the cellular system 12. The device 25 has a position location function 26 and communicates with the mobile station 23.

The communication system 10 provides wireless communications for the mobile station 23, and is not limited to cellular, fixed wireless, PCS, or satellite communications systems. The communication system 10 may provide for multiple access communications, in accordance with any standard or protocol, such as, for example, CDMA, TDMA, FDMA, or GSM, or combinations thereof.

GPS System 11

The GPS system 11 is a collection of satellites, such as GPS satellites 14-17, each of which travels in a precise orbit above the earth's surface. Each satellite transmits a signal modulated with a pseudo-noise (PN) code unique to the satellite. Each PN code comprises a predetermined number of chips. For example, the PN code is a sequence of 1,023 chips that is repeated every millisecond. A GPS receiver, such as GPS receiver 24, receives a composite signal comprising a mixture of signals from each of the satellites that are visible to the GPS receiver. A signal detector in the receiver detects a transmission from a particular satellite by determining the degree of correlation between the received signal and shifted versions of the PN code for that satellite. If a peak of sufficient quality in the correlation value for one of the shift offsets is detected, the GPS receiver is considered to have detected the transmission from the satellite.

To perform position location for the mobile station 23 in wireless cellular networks (e.g., cellular system 12), several approaches perform a position calculation using a number of geometrically distinct measurements, such as range, pseudo-range, round trip delay and others that are associated with distinct reference points (e.g., GPS satellites, pseudolites, base stations, surface of the earth).

One approach, called Advanced Forward Link Trilateration (AFLT) or Enhanced Observed Time Difference (EOTD), measures at the mobile station 23 the times of arrival of signals transmitted from each of several base stations (e.g., transmissions from base stations 18, 19, and 20). These times are transmitted to a Position Determination Entity (PDE) (e.g., a location server), which computes the position of the mobile station 23 using these times of reception. The transmit times at these base stations are coordinated such that at a particular instance of time, the times-of-day associated with multiple base stations 18-20 are within a specified error bound. The accurate positions of the base stations 18-20 and the times of reception are used to determining the position of the mobile station 23.

In an AFLT system, the times of reception of signals from the base stations 18-20 are measured at the mobile station 23. This timing data may then be used to compute the position of the mobile station 23. Such computation may be done at the mobile station 23 or at the location server 22, if the timing information so obtained by the mobile station 23 is transmitted to the location server 22 via a communication link. Typically, the times of receptions are communicated to the location server 22 through one of the cellular base stations 18-20. The location server 22 is coupled to receive data from the base stations through the mobile switching center 21. The location server 22 may include a base station almanac (BSA) server, which provides the location of the base stations and/or the coverage area of base stations. Alternatively, the location server 22 and the BSA server may be separate from each other, and the location server 22 communicates with the base station to obtain the base station almanac for position determination. The mobile switching center 21 provides signals (e.g., voice, data, and/or video communications) to and from the landline Public Switched Telephone System (PSTS) 13 so that signals may be conveyed to and from the mobile station 23 to other telephones (e.g., landline phones on the PSTS or other mobile telephones). In some cases, the location server 22 may also communicate with the mobile switching center 21 via a cellular link. The location server 22 may also monitor emissions from several of the base stations 18-20 in an effort to determine the relative timing of these emissions.

In another approach, called Time Difference of Arrival (TDOA), the times of reception of a signal from the mobile station 23 is measured at several base stations 18-20. This timing data may then be communicated to the location server 22 to compute the position of the mobile station 23.

Yet a third approach of doing position location involves the use in the mobile station 23 of a receiver for the United States Global Positioning Satellite (GPS) system or other Satellite Positioning System (SPS), such as the Russian GLONASS system or the proposed European Galileo System. The GLONASS system primarily differs from GPS system in that the emissions from different satellites are differentiated from one another by utilizing slightly different carrier frequencies, rather than utilizing different pseudorandom codes. In this situation, substantially all the circuitry and algorithms described previously are applicable. The term "GPS" used herein includes such alternative satellite positioning systems, including the Russian GLONASS system and the proposed European Galileo System.

In the third approach, the GPS receiver 24 estimates its location by detecting transmissions from at least four of the satellites. For each detected transmission, the receiver uses the shift in the PN code to estimate the delay (in terms of chips or fractions of chips) between time of transmission and time of arrival. Given the known velocity of the transmission, the GPS receiver estimates the distance between itself and the satellite. This estimated distance defines a sphere around the satellite. The GPS receiver 24 knows the precise orbits and positions of each of the satellites, and continuously receives updates to these orbits and positions. From this information, the GPS receiver 24 is able to determine its position (and the current time) from the point where the spheres for the four satellites intersect.

Although the methods and apparatus of the present invention have been described with reference to GPS satellites, it will be appreciated that the description are equally applicable to positioning systems which utilize pseudolites, or a combination of satellites and pseudolites. Pseudolites are ground-based transmitters, which broadcast a PN code (similar to a GPS signal) modulated on an L-band carrier signal, generally synchronized with GPS time. Each transmitter may be assigned a unique PN code to permit identification by a remote receiver. Pseudolites are useful in situations where GPS signals from an orbiting satellite might be unavailable, such as tunnels, mines, buildings, or other enclosed areas. The term "satellite", as used herein, is intended to include pseudolites or equivalents of pseudolites, and the term GPS signals, as used herein, are intended to include GPS-like signals from pseudolites or equivalents of pseudolites.

Such a method using a receiver for SPS signals may be completely autonomous or may utilize the cellular network to provide assistance data or to share in the position calculation. As shorthand, these various methods are referred to as "GPS." Examples of such methods are described in U.S. Pat. Nos. 5,945,944; 5,874,914; 6,208,290; 5,812,087; and 5,841,396.

For instance, U.S. Pat. No. 5,945,944 describes a method to obtain from cellular phone transmission signals accurate time information, which is used in combination with GPS signals to determine the position of the receiver. U.S. Pat. No. 5,874,914 describes a method to transmit the Doppler frequency shifts of in view satellites to the receiver through a communication link to determine the position of the receiver. U.S. Pat. No. 5,874,914 further describes a method to transmit satellite almanac data (or ephemeris data) to a receiver through a communication link to help the receiver to determine its position. U.S. Pat. No. 5,874,914 also describes a method to lock to a precision carrier frequency signal of a cellular telephone system to provide a reference signal at the receiver for GPS signal acquisition. U.S. Pat. No. 6,208,290 describes a method to use an approximate location of a receiver to determine an approximate Doppler for reducing SPS signal processing time. U.S. Pat. No. 5,812,087 describes a method to compare different records of a satellite data message received at different entities to determine a time at which one of the records is received at a receiver in order to determine the position of the receiver.

In practical low-cost implementations, both the cellular communications receiver 32 (shown in FIG. 2) and the GPS receiver 24 in the mobile station's 23 are integrated into the same enclosure and, may in fact share common electronic circuitry, such as receiver circuitry and/or antenna.

In yet another variation of the above methods, the round trip delay (RTD) is found for signals that are sent from the base station 18, 19, or 20 to the mobile station 23 and then are returned to the corresponding base station 18, 19, or 20. In a similar but alternative method, the round trip delay is found for signals that are sent from the mobile station 23 to the base station and then returned to the mobile station 23. The round-trip delays are each divided by two to determine an estimate of the one-way time delay. Knowledge of the location of the base station, plus a one-way delay constrains the location of the mobile station 23 to a circle on the earth. Two such measurements from distinct base stations then result in the intersection of two circles, which in turn constrains the location to two points on the earth. A third measurement (even an angle of arrival or cell sector) resolves the ambiguity.

A combination of either the AFLT or TDOA with a GPS system is called a "hybrid" system. For example, U.S. Pat. No. 5,999,124 describes a hybrid system, in which the position of a cell based transceiver is determined from a combination of at least: i) a time measurement that represents a time of travel of a message in the cell based communication signals between the cell based transceiver and a communication system, and ii) a time measurement that represents a time of travel of an SPS signal.

Altitude aiding has been used in various methods for determining the position of a mobile device. Altitude aiding is typically based on a pseudo-measurement of the altitude. The knowledge of the altitude of a location of a mobile station 23 constrains the possible positions of the mobile station 23 to a surface of a sphere (or an ellipsoid) with its center located at the center of the earth. This knowledge may be used to reduce the number of independent measurements required to determine the position of the mobile station 23. For example, U.S. Pat. No. 6,061,018 describes a method where an estimated altitude is determined from the information of a cell object, which may be a cell site that has a cell site transmitter in communication with the mobile station 23.

When a minimum set of measurements are available, a unique solution to the navigation equations can be determined for the position of the mobile station 23. When more than one extra measurement is available, the "best" solution may be obtained to best fit all the available measurements (e.g., through a least square solution procedure that minimizes the residual vector of the navigation equations). Since the residual vector is typically non-zero when there are redundant measurements, due to the noises or errors in the measurements, an integrity-monitoring algorithm can be used to determine if all the measurements are consistent with each other.

For example, a traditional Receiver Autonomous Integrity Monitoring (RAIM) algorithm may be used to detect if there is a consistency problem in the set of the redundant measurements. For example, one RAIM algorithm determines if the magnitude of the residual vector for the navigation equations is below a threshold value. If the magnitude of the residual vector is smaller than the threshold, the measurements are considered consistent. If the magnitude of the residual vector is larger than the threshold, there is an integrity problem, in which case one of the redundant measurements that appears to cause the most inconsistency may then be removed to obtain an improved solution.

Cellular System 12

Multiple cellular base stations 18-20 are typically arranged to cover a geographical area with radio coverage, and these different base stations 18-20 are coupled to at least one cellular switching center 21, as is well known in the prior art. Thus, multiple base stations 18-20 would be geographically distributed, but coupled by a cellular switching center 21. The cellular system 12 may be connected to a network of reference GPS receivers, which provide differential GPS information, and may provide GPS ephemeris data for use in calculating the position of mobile stations. The cellular system 12 is coupled through a modem or other communication interface, to other computers or network components, and/or to computer systems operated by emergency operators, such as the Public Safety Answering Points, which respond to 911 telephone calls. In IS-95 compliant CDMA systems, each base station or sector 18-20 transmits a pilot signal, which is modulated with a repeating pseudo-random noise (PN) code, which uniquely identifies that base station. For example, for IS-95 compliant CDMA systems, the PN code is a sequence of 32,768 chips, which is repeated every 26.67 mSec.

The location server 22 typically includes communication devices, such as modems or network interface. The location server 22 may be coupled to a number of different networks through communication devices (e.g., modems or other network interfaces). Such networks include the cellular switching center 21 or multiple cellular switching centers, land based phone system switches, cellular base stations 18-20, other GPS signal receivers, or other processors or location servers. Various examples of methods for using a location server 22 have been described in numerous U.S. patents, including: U.S. Pat. Nos. 5,841,396, 5,874,914, 5,812,087, and 6,215,442.

The location server 22, which is a form of a data processing system, includes a bus, which is coupled to a microprocessor and a ROM and volatile RAM and a non-volatile memory (each not shown). The processor is coupled to cache memory (not shown). The bus interconnects these various components together. The location server 22 may utilize a non-volatile memory, which is remote from the cellular system 22, such as a network storage device, which is coupled to the data processing system through a network interface such as a modem or Ethernet interface. The bus may include one or more buses connected to each other through various bridges, controllers and/or adapters as are well known in the art. In many situations, the location server 22 may perform its operations automatically without human assistance. In some designs where human interaction is required, an I/O controller (not shown) may communicate with displays, keyboards, and other I/O devices. It will also be appreciated that network computers and other data processing systems which have fewer components or perhaps more components may also be used with the present invention and may act as a location server or a PDE.

Mobile Station 23 and Device 25

Figure 2:
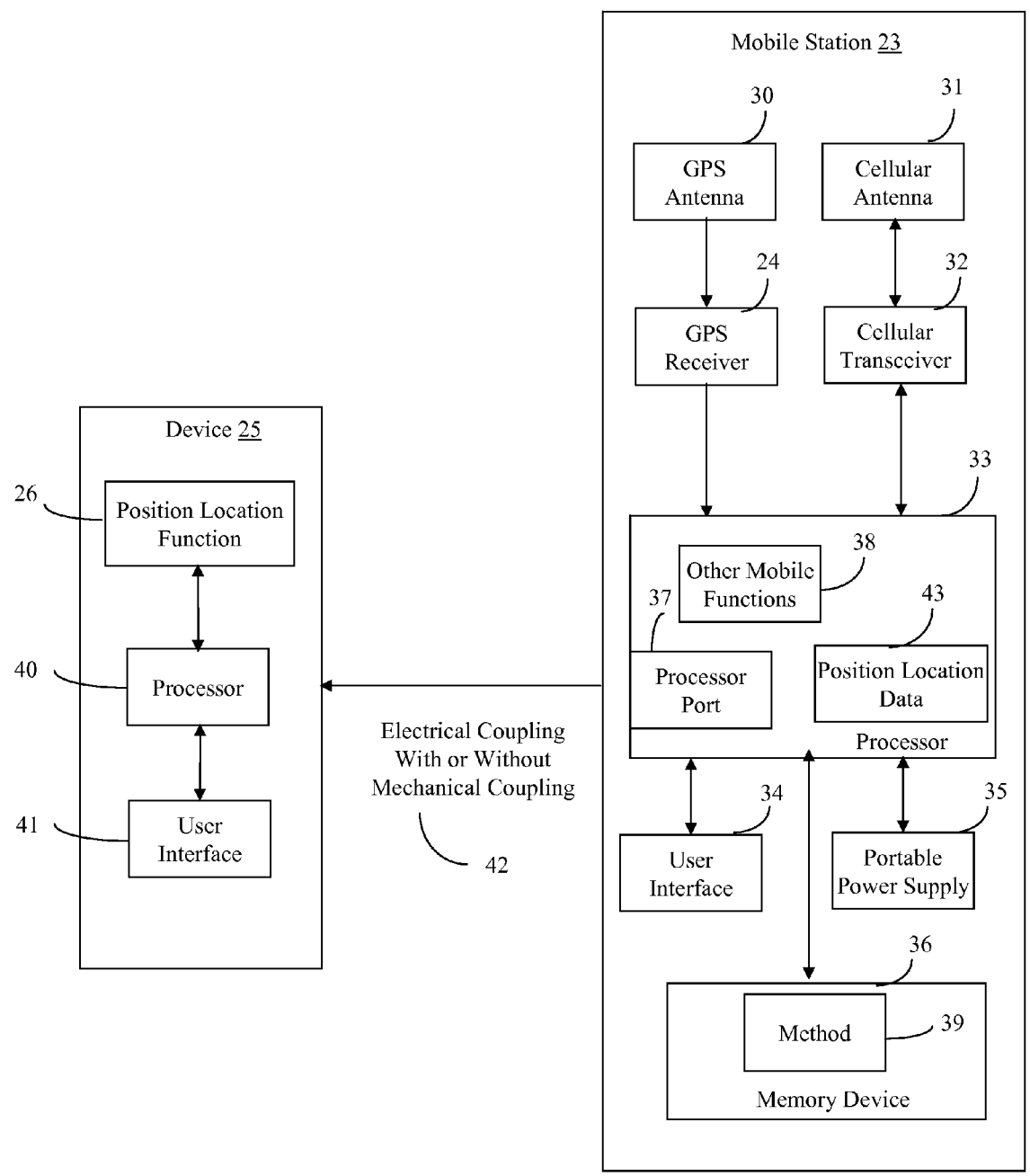
FIG. 2 illustrates more detailed block diagrams representing the mobile station and the device, as shown in FIG. 1, according to one embodiment of the present invention.

FIG. 2 illustrates more detailed block diagrams representing the mobile station 23 and the device 25, as shown in FIG. 1.

The mobile station 23 includes a GPS antenna 30, the GPS receiver 24, a cellular antenna 31, a cellular transceiver 32, a processor 33, a user interface 34, a portable power supply 35, and a memory device 36. The processor 33 further includes a processor port 37 and other mobile functions 38. The memory device 36 further includes the method 39.

In the mobile station 23, the GPS antenna 30 and the GPS receiver include circuitry, such as acquisition and tracking circuitry (not shown), for performing the functions required for receiving and processing GPS signals. GPS signals (e.g., a signal transmitted from one or more satellites 14-17) are received through the GPS antenna 30 and input to acquisition and tracking circuit, which acquires the PN (Pseudorandom Noise) codes for the various received satellites 14-17. Data produced by circuit (e.g., correlation indicators (not shown)) are processed by the processor 33, either alone or in combination with other data received from or processed by the cellular system 12, to produce position location data 43 (e.g., latitude, longitude, time, satellites, etc.)

The cellular antenna 31 and the cellular transceiver 32 includes circuitry for performing functions required for processing communication signals received and transmitted over a communication link. The communication link is typically a radio frequency communication link to another component, such as one or more base stations 18-20 having communication antenna (not shown).

The cellular transceiver 32 contains a transmit/receive switch (not shown), which routes communication signals (e.g., radio frequency signals) to and from the communication antenna 31 and the transceiver 32. In some mobile stations, a band splitting filter, or "duplexer," is used instead of the T/R switch. Received communication signals are input to a communication receiver in the transceiver 32, and passed to processor 33 for processing. Communication signals to be transmitted from processor 33 are propagated to modulator and frequency converter (not shown), each in the transceiver. A power amplifier (not shown) in the transceiver 32 increases the gain of the signal to an appropriate level for transmission to one or more base stations 18-20.

In one embodiment of the mobile station 23, data generated by acquisition and tracking circuitry in the GPS receiver 24 is transmitted over a communication link (e.g., a cellular channel) to one or more base stations 18-20. The location server 22 then determines the location of mobile station 23 based on the data from the GPS receiver 24, the time at which the data were measured, and ephemeris data received from the base station's own GPS receiver or other sources of such data. The position location data can then be transmitted back to mobile station 23 or to other remote locations. More details about portable receivers utilizing a communication link are disclosed in commonly assigned U.S. Pat. No. 5,874,914.

The user interface 34 further provides a data input device and a data output device (each not shown).

The data input device typically provides data to a processor in response to receiving input data either manually from a user or automatically from another electronic device. For manual input, the data input device is a keyboard and a mouse, but also may be a touch screen, or a microphone and a voice recognition application, for example.

The data output device typically provides data from a processor for use by a user or another electronic device. For output to a user, the data output device is a display that generates one or more display images in response to receiving the display signals from the processor 33, but also may be a speaker or a printer, for example. Examples of display images include, for example, text, graphics, video, photos, images, graphs, charts, forms, etc.

The memory device 36 represents any type of data storage device, such as computer memory devices or other tangible or computer-readable storage medium, for example. The memory device 36 represents one or more memory devices, located at one or more locations, and implemented as one or more technologies, depending on the particular implementation of the mobile station 23. In addition, the memory device 36 may be any device readable by a processor and capable of storing data and/or a series of instructions embodying a process (e.g., the method 39). Examples of the memory device 36 include, but are not limited to, RAM, ROM, EPROM, EEPROM, PROM, disk (hard or floppy), CD-ROM, DVD, flash memory, etc.

The processor 33 controls the operation of the mobile station 23. The other mobile functions 38 in the processor represent any or all other functions of the mobile station 23 that have not already been described herein. Such other mobile functions 38 include, for example, operating the mobile station 23 to permit the mobile station to make telephone calls and communicate data.

The processor 33 has at least one processor port 37 an interface to the processor 33 that is adapted to provide the position location data 43. For example, the processor port 37 may represent one or more dedicated or multiplexed ports on the processor 33 or may represent communications via the cellular transceiver 32.

The position location data 43 may be communicated via the processor port 37 using any type of protocol. For example, the protocol may be the NMEA 0183 protocol or the proposed NMEA 2000 protocol, which is defined and controlled by the US based National Marine Electronics Association (NMEA). NMEA is a combined electrical and data specification for communication between marine electronics and also, more generally, GPS receivers, such as the GPS receiver 24. The NMEA protocol is a means by which marine instruments and most GPS receivers can communicate with each other.

The NMEA 0183 protocol uses a simple American Standard Code for Information Interchange (ASCII), serial communications protocol that defines how data is transmitted in a "sentence" from one "talker" to one or more "listeners". The standard also defines the contents of each sentence (message) type so that all listeners can parse messages accurately. Each message starting character is a dollar sign. The next first five characters identify the type of message. All data fields that follow are comma-delimited. The first character that immediately follows the last data field character is an asterisk. The asterisk is immediately followed by a two-digit checksum.

The portable power supply 35 stores and provides portable electrical energy for the electrical elements of the mobile station 23. Examples of the portable power supply 35 include, but are not limited to, batteries and fuel cells. The portable power supply 35 may be or may not be rechargeable. The portable power supply 35 typically has a limited amount of stored electrical energy, and needs to be replaced or renewed after some amount of use so that the mobile station can continue to operate.

The device 25 includes the position location function 26, a processor 40, and a user interface 41. The device may also include a portable power supply, and a memory device (each not shown), which may be similar to those in the mobile station 23. The user interface 41 also may be similar to that described in the mobile station 23.

In the device 25, the processor 40 is communicates data to and from the position location function 26, and to and from the user interface 41. The position location function 26 represents any type of function that operates in response to position location data, such as the position location data 43 determined and/or provided by the mobile station 23.

Examples of the position location function 26 include an endless variety of applications on land, sea, and air. The scientific community uses GPS for its precision timing capability and position information. Surveyors use GPS for an increasing portion of their work. Recreational uses of GPS are almost as varied as the number of recreational sports available. GPS is popular among hikers, hunters, mountain bikers, and cross-country skiers, just to name a few. Anyone who needs to keep track of where he or she is, to find his or her way to a specified location, or know what direction and how fast he or she is going can utilize the benefits of the global positioning system. GPS is now commonplace in vehicles as well. Some basic systems are in place and provide emergency roadside assistance at the push of a button (e.g., by transmitting your current position to a dispatch center). More sophisticated systems also show the vehicle's position on a street map. Currently these systems allow a driver to keep track of where he or she is and suggest the best route to follow to reach a designated location.

The device 25 may be fixed (i.e., stationary) and/or mobile (i.e., portable). The device 25 may be implemented in a variety of forms including, but not limited to, one or more of the following: a personal computer (PC), a desktop computer, a laptop computer, a workstation, a minicomputer, a mainframe, a supercomputer, a network-based device, a data processor, a personal digital assistant (PDA), a smart card, a cellular telephone, a pager, and a wristwatch.

In one embodiment of the present invention, the device 25 is located external to the mobile station 23 and separate from the mobile station 23 when the device is electrically coupled to the mobile station or when the device is electrically decoupled from the mobile station. This may be the case when the device 25 is the same size or larger than the mobile station 23 (e.g., a laptop computer), or when the mobile station does not permit a more integrated mechanical arrangement. In this embodiment, the device 25 is referred to as "external" (i.e., outside, separate, distinct, etc.) to the mobile station 23 with reference to the physical relationship of the device 25 to the mobile station 23 before and after the electrical coupling.

In another embodiment of the present invention, the device 25 is located internal to the mobile station 23 and integrated with the mobile station 23 when the device 25 is electrically coupled to the mobile station 23. The device 25 is located external to the mobile station 23 and separate from the mobile station 23 when the device 25 is electrically decoupled from the mobile station 23. This may be the case when the device 25 is the same size or smaller than the mobile station 23 (e.g., a smart card), or when the mobile station 23 permits a more integrated mechanical arrangement. In this embodiment, the device 25 is also referred to as "external" (i.e., outside, separate, distinct, etc.) to the mobile station 23, with reference to the physical relationship of the device 25 to the mobile station 23 before the electrical coupling.

In one embodiment of the present invention, the mobile station 23 is adapted to be electrically coupled to the device 25 and electrically decoupled from the device 25 over a communication link 42 (otherwise called network, bus, path, connection, channel, etc.).

The communication link 42, providing the electrical coupling, may use any technology, such as, for example, wired or wireless. Examples of a wired communication link 42 include communication ports (e.g., a USB (Universal Serial Bus) port, a port for IEEE-1394 bus connection), such as the processor port 37. Examples of a wireless communication link 42 include radio frequency, infrared frequency, ultrasonic frequency, and microwave frequency. A particular example of a wireless communication link 42 using radio frequency is known as Bluetooth®.

The communication link 42, providing the electrical coupling, may use any protocol or data format. Examples of the protocol or data format includes, but is not limited to, one or more of the following: the NMEA described above, an Internet Protocol (IP), a Transmission Control Protocol Internet protocol (TCPIP), a Hyper Text Transmission Protocol (HTTP), an RS232 protocol, an Ethernet protocol, a Medical Interface Bus (MIB) compatible protocol, a Local Area Network (LAN) protocol, a Wide Area Network (WAN) protocol, a Campus Area Network (CAN) protocol, a Metropolitan Area Network (MAN) protocol, a Home Area Network (HAN) protocol, an Institute Of Electrical And Electronic Engineers (IEEE) bus compatible protocol, a Digital and Imaging Communications (DICOM) protocol, and a Health Level Seven (HL7) protocol.

In one embodiment of the present invention, the mobile station 23 transmits the position location data 43 to the device 25 via the processor port 37 in the mobile station 23 so that the processor 40 in the device 25 can use the position location data 43 for the position location function 26.

FIG. 3 illustrates a method 39, which may be employed by the mobile station 23, as shown in FIG. 2. The method 39 describes steps, which might otherwise be called sequences, operations, functions, or the like. At step 50, the method 39 starts. At step 51, the method 39 monitors the mobile station 23, which is adapted to be electrically coupled to or electrically decoupled from the device 25. In one embodiment of the present invention, the method monitors the processor port 37 for electrical connection between the mobile station 23 and the device 25. The step 51 of monitoring may be performed in various ways, whether at the processor port 37 or otherwise. At step 52, the method 39 determines whether the mobile station is electrically coupled to or electrically decoupled from the device 25 in response to monitoring the mobile station 23 in step 51. At step 53, the method 39 generates preliminary position location data for the position location function 26 in the device 25. The preliminary position location data is otherwise called seed data, and represents an advanced preparation (e.g., form and/or content) of the position location data 43, before the position location data 43 is sent to the device 25. Such advanced preparation of the position location data 43 permits the mobile station 23 to provide the position location data 43 to the device 25 more quickly when desired or required.

At step 54, the method 39 monitors activity of the position location function 26 in the device 25 in response to determining that the mobile station 23 is electrically coupled to the device 25. In one embodiment of the present invention, the method monitors the processor port 37 for electrical activity generated by the position location function 26 in the device 25. For example, the method 39 detects when the position location function 26 in the device 25 opens (i.e.; active) and closes (i.e., inactive) the processor port 37 to start and stop, respectively, receiving the position location data 43 from the mobile station 23. The step 54 of monitoring may be performed in various ways, whether at the processor port 37 or otherwise. At step 55, the method 39 determines whether a position location function 26 in the device 25 is active in response to determining that the mobile station 23 is electrically coupled to the device in step 54. At step 56, the method 39 generates (i.e., tracking position location fixes) the position location data 43 for the position location function 26 in the device 25 in response to determining that the mobile station 23 is electrically coupled to the device 25 at step 52, and in response to determining that the position location function 26 in the device 25 is active at step 55. The method 39 generates the position location data 43 at any frequency, such as continuously, periodically, when desired, or when required. The method 39 may generate the position location data 43 in response to a determination by the mobile station 23 and/or in response to a determination by the device 25. For example, the mobile station 23 generates the position location data 43 when the location of the mobile station 23 changes, or when the position location function 26 requires, uses, receives, or needs, etc. the position location data 43. At step 57, the method 39 does not generate position location data for the position location function 26 in the device 25 in response to determining that the mobile station 23 is electrically decoupled from the device 25 at step 52, or in response to determining that the position location function 26 in the device 25 is not active at step 55. At step 58, the method 39 performs the other functions 38 by the mobile station 23, if required or desired. Although the operational sequences in the example of the method 39 are illustrated in specific sequences, the method 39 should not be limited to the illustrated example. It will be appreciated that various different operation sequences and variations of the operational sequences themselves can be used, without departing from the broader spirit and scope of the invention. The method and the apparatus, employed by the mobile station 23, automatically start and/or stop the generation of position location data 43 for position location functions 26 in external devices 25, which are adapted to be electrically coupled to and electrically decoupled from the mobile station 25. The method and the apparatus permit devices to perform position location functions 26, without having a GPS receiver or other position location device in the device 25. This reduces the complexity, size, and cost of the device 25. The method and the apparatus further permit the generation of position location data 43, without being requested or controlled by the device 25. In other words, bi-directional communications between the mobile station 23 and the device 25 is not necessary because the mobile station 23 has detection capabilities to detect the electrical coupling and the communication activity. The mobile station's detection capability simplifies the operation of the mobile station 23 and the device 25. In one perspective, the method and the apparatus provide a "plug and play" operation in the sense that the device 25 is "plugged" into the mobile station 23, and the position location function 26 is "played" (i.e., operated, used, opens or closes the port 37, etc.). After the mobile station 23 detects the "plug and play" by the device 25, the mobile station 23 generates the position location data 43. The method and the apparatus further permit the mobile station 23 to perform the function of a conventional, stand alone, GPS receiver, without wasting resources, such as unnecessarily draining the portable power supply 35. For example, with the method and the apparatus, the mobile station 23 does not need to be turned on and generating position location data 43, even though the position location function 26 in the device 25 does not require the position location data 43. Therefore, the method and the apparatus conserve resources in the mobile station 23 for the other mobile functions 38 (e.g., phone calls or data exchanges) or extended use of the other mobile functions 38 (e.g., longer talk time or standby time). The system, elements, and/or processes contained herein, such as the system 10, the mobile station 23, the device 25, and the method 39, may be implemented in hardware, software, or a combination of both, and may include one or more processors. A processor is a device and/or set of machine-readable instructions for performing task. A processor may be any device, capable of executing a series of instructions embodying a process, including but not limited to a computer, a microprocessor, a controller, an application specific integrated circuit (ASIC), finite state machine, digital signal processor (DSP), or some other mechanism. The processor includes any combination of hardware, firmware, and/or software. The processor acts upon stored and/or received information by computing, manipulating, analyzing, modifying, converting, or transmitting information for use by an executable application or procedure or an information device, and/or by routing the information to an output device.

An executable application comprises machine code or machine readable instruction for implementing predetermined functions including, for example, those of an operating system, a software application program, or other information processing system, for example, in response user command or input.

An executable procedure is a segment of code (i.e., machine readable instruction), sub-routine, or other distinct section of code or portion of an executable application for performing one or more particular processes, and may include performing operations on received input parameters (or in response to received input parameters) and providing resulting output parameters.

In various embodiments, hardwired circuitry may be used in combination with software instructions to implement the present invention. Thus, the techniques are not limited to any specific combination of hardware circuitry and software, nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processor 33.

It will be apparent from this description that aspects of the present invention may be embodied, at least in part, in software. That is, the techniques may be carried out in a computer system or other data processing system in response to its processor executing sequences of instructions contained in a machine-readable medium.

A machine-readable medium includes any mechanism that provides (i.e., stores and/or transmits) information in a form accessible by a machine (e.g., a computer, network device, personal digital assistant, computer, data processor, manufacturing tool, any device with a set of one or more processors, etc.). A machine-readable medium (e.g., memory device 36) can be used to store software (e.g., for the method 39) and data which, when executed by a data processing system (e.g., processor 33), causes the system to perform various methods of the present invention. Portions of this executable software and/or data may be stored in various places. For example, a machine-readable medium includes recordable/non-recordable media (e.g., read only memory (ROM), random access memory (RAM), magnetic disk storage media, optical storage media, flash memory devices, non-volatile memory, cache, remote storage device, etc.), as well as electrical, optical, acoustical or other forms of propagated signals (e.g., carrier waves, infrared signals, digital signals, etc.); etc. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for operating a mobile station, comprising:
   determining, by the mobile station, whether the mobile station is electrically coupled to or electrically decoupled from a device;
   determining, by the mobile station, whether a position location function in the device is active in response to determining that the mobile station is electrically coupled to the device; wherein the position location function in the device performs a position location operation in response to receiving position location data from the mobile station;
   generating, by the mobile station, the position location data for the position location function in the device in response to determining that the mobile station is electrically coupled to the device and in response to determining that the position location function in the device is active; and
   not generating, by the mobile station, position location data for the position location function in the device in response to determining that the mobile station is electrically decoupled from the device or in response to determining that the position location function in the device is not active.

2. A method for operating a mobile station, according to claim 1, further comprising:
   monitoring, by the mobile station, a position location processor port adapted to be electrically coupled to the device;
   wherein the determining, by the mobile station, whether the mobile station is electrically coupled to the device is responsive to the monitoring.

3. A method for operating a mobile station, according to claim 1,
   wherein the position location data further comprises a National Marine Electronics Association (NMEA) protocol.

4. A method for operating a mobile station, according to claim 1, further comprising:
   monitoring, by the mobile station, the activity of the position location function in the device in response to determining that the mobile station is electrically coupled to the device;
   wherein the determining, by the mobile station, whether the position location function in the device is active is responsive to the monitoring.

5. A method for operating a mobile station, according to claim 1, further comprising:
   generating, by the mobile station, preliminary position location data for the position location function in the device in response to determining that the mobile station is electrically coupled to the device.

6. A method for operating a mobile station, according to claim 5,
   wherein the preliminary position location data further comprises at least one of form and content of the position location data.

7. A method for operating a mobile station, according to claim 1,
   wherein the mobile station is electrically coupled to the device using a wired connection or a wireless connection.

8. A method for operating a mobile station, according to claim 1,
   wherein the position location function in the device is embodied within at least one of the following: an executable application and hardware.

9. A method for operating a mobile station, according to claim 1,
   wherein the device is located external to the mobile station and separate from the mobile station when the device is electrically coupled to the mobile station or when the device is electrically decoupled from the mobile station.

10. A method for operating a mobile station, according to claim 1,
    wherein the device is located internal to the mobile station and integrated with the mobile station when the device is electrically coupled to the mobile station, and
    wherein the device is located external to the mobile station and separate from the mobile station when the device is electrically decoupled from the mobile station.

11. A method for operating a mobile station, according to claim 1,
    wherein the position location function in the device is active when the position location function opens a processor port in the mobile station.

12. A method employed by a mobile station, comprising:
    monitoring a position location processor port adapted to be electrically coupled to an external device;
    determining whether the position location processor port is electrically coupled to the external device in response to monitoring the position location processor port;

generating preliminary position location data for a function in the external device in response to determining that the position location processor port is electrically coupled to the external device;
monitoring activity of the function in the external device on the position location processor port in response to generating the preliminary position location data;
determining whether the function in the external device is active on the position location processor port in response to monitoring activity of the function in the external device;
generating position location data for the function in the external device in response to determining that the function in the external device is active on the position location processor port; and
not generating position location data for the function in the external device in response to determining that the position location processor port is not electrically coupled to the external device or in response to determining that the function in the external device is not active on the position location processor port.

13. A mobile station comprising:
a processor having a position location processor port adapted to provide position location data and adapted to be electrically coupled to an external device, wherein the processor is adapted to:
monitor a position location processor port adapted to be electrically coupled to an external device;
determine whether the position location processor port is electrically coupled to the external device in response to monitoring the position location processor port;
generate preliminary position location data for a function in the external device in response to determining that the position location processor port is electrically coupled to the external device;
monitor activity of the function in the external device on the position location processor port in response to generating the preliminary position location data;
determine whether the function in the external device is active on the position location processor port in response to monitoring activity of the function in the external device;
generate position location data for the function in the external device in response to determining that the function in the external device is active on the position location processor port; and
not generate position location data for the function in the external device in response to determining that the position location processor port is not electrically coupled to the external device or in response to determining that the function in the external device is not active on the position location processor port.

14. A mobile station comprising:
means for monitoring a position location processor port adapted to be electrically coupled to an external device;
means for determining whether the position location processor port is electrically coupled to the external device in response to monitoring the position location processor port;
means for generating preliminary position location data for a function in the external device in response to determining that the position location processor port is electrically coupled to the external device;
means for monitoring activity of the function in the external device on the position location processor port in response to generating the preliminary position location data;
means for determining whether the function in the external device is active on the position location processor port in response to monitoring activity of the function in the external device;
means for generating position location data for the function in the external device in response to determining that the function in the external device is active on the position location processor port; and
means for not generating position location data for the function in the external device in response to determining that the position location processor port is not electrically coupled to the external device or in response to determining that the function in the external device is not active on the position location processor port.

15. A non-transitory machine-readable medium comprising instructions, which, when executed by a machine, cause the machine to perform operations, the instructions comprising:
instructions to monitor a position location processor port adapted to be electrically coupled to an external device;
instructions to determine whether the position location processor port is electrically coupled to the external device in response to monitoring the position location processor port;
instructions to generate preliminary position location data for a function in the external device in response to determining that the position location processor port is electrically coupled to the external device;
instructions to monitor activity of the function in the external device on the position location processor port in response to generating the preliminary position location data instructions to determine whether the function in the external device is active on the position location processor port in response to monitoring activity of the function in the external device;
instructions to generate position location data for the function in the external device in response to determining that the function in the external device is active on the position location processor port; and
instructions to not generate position location data for the function in the external device in response to determining that the position location processor port is not electrically coupled to the external device or in response to determining that the function in the external device is not active on the position location processor port.

16. A mobile station comprising:
a processor adapted to provide position location data and adapted to be electrically coupled to an external device, wherein the processor is adapted to:
determine, by the mobile station, whether the mobile station is electrically coupled to or electrically decoupled from a device;
determine, by the mobile station, whether a position location function in the device is active in response to determining that the mobile station is electrically coupled to the device, wherein the position location function in the device performs a position location operation in response to receiving position location data from the mobile station;
generate, by the mobile station, the position location data for the position location function in the device in response to determining that the mobile station is electrically coupled to the device and in response to determining that the position location function in the device is active; and
not generate, by the mobile station, position location data for the position location function in the device in response to determining that the mobile station is electrically decoupled from the device or in response to determining that the position location function in the device is not active.

17. The mobile station according to claim 16, wherein the processor is further adapted to
monitor, by the mobile station, a position location processor port adapted to the electrically coupled to the device,
wherein the determining, by the mobile station, whether the mobile station is electrically coupled to the device is responsive to the monitoring.

18. The mobile station according to claim 16, wherein the processor is further adapted to
monitor, by the mobile station, the activity of the position location function in the device in response to determining that the mobile station is electrically coupled to the device,
wherein the determining, by the mobile station, whether the position location function in the device is active is responsive to the monitoring.

19. The mobile station according to claim 16, wherein the processor is further adapted to
generate, by the mobile station, preliminary position location data for the position location function in the device in response to determining that the mobile station is electrically coupled to the device.

20. A mobile station comprising:
means for determining, by the mobile station, whether the mobile station is electrically coupled to or electrically decoupled from a device;
means for determining, by the mobile station, whether a position location function in the device is active in response to determining that the mobile station is electrically coupled to the device, wherein the position location function in the device performs a position location operation in response to receiving position location data from the mobile station;
means for generating, by the mobile station, the position location data for the position location function in the device in response to determining that the mobile station is electrically coupled to the device and in response to determining that the position location function in the device is active; and
means for not generating, by the mobile station, position location data for the position location function in the device in response to determining that the mobile station is electrically decoupled from the device or in response to determining that the position location function in the device is not active.

21. The mobile station according to claim 20, further comprising:
means for monitoring, by the mobile station, a position location processor port adapted to be electrically coupled to the device,
wherein the determining, by the mobile station, whether the mobile station is electrically coupled to the device is responsive to the monitoring.

22. The mobile station according to claim 20, further comprising:
means for monitoring, by the mobile station, the activity of the position location function in the device in response to determining that the mobile station is electrically coupled to the device,
wherein the determining, by the mobile station, whether the position location function in the device is active is responsive to the monitoring.

23. The mobile station according to claim 20, further comprising:
means for generating, by the mobile station, preliminary position location data for the position location function in the device in response to determining that the mobile station is electrically coupled to the device.

24. A non-transitory machine-readable medium comprising instructions, which, when executed by a machine, cause the machine to perform operations, the instructions comprising:
instructions to determine, by the mobile station, whether the mobile station is electrically coupled to or electrically decoupled from a device;
instructions to determine, by the mobile station, whether a position location function in the device is active in response to determining that the mobile station is electrically coupled to the device, wherein the position location function in the device performs a position location operation in response to receiving position location data from the mobile station;
instructions to generate, by the mobile station, the position location data for the position location function in the device in response to determining that the mobile station is electrically coupled to the device and in response to determining that the position location function in the device is active; and
instructions to not generate, by the mobile station, position location data for the position location function in the device in response to determining that the mobile station is electrically decoupled from the device or in response to determining that the position location function in the device is not active.

25. The non-transitory machine-readable medium of claim 24, further comprising:
instructions to monitor, by the mobile station, a position location processor port adapted to be electrically coupled to the device,
wherein the determining, by the mobile station, whether the mobile station is electrically coupled to the device is responsive to the monitoring.

26. The non-transitory machine-readable medium of claim 24, further comprising:
instructions to monitor, by the mobile station, the activity of the position location function in the device in response to determining that the mobile station is electrically coupled to the device,
wherein the determining, by the mobile station, whether the position location function in the device is active is responsive to the monitoring.

27. The non-transitory machine-readable medium of claim 24, further comprising:
instructions to generate, by the mobile station, preliminary position location data for the position location function in the device in response to determining that the mobile station is electrically coupled to the device.

* * * * *